United States Patent
Han et al.

(10) Patent No.: US 10,982,298 B2
(45) Date of Patent: Apr. 20, 2021

(54) HOT-DIP GALVANIZED STEEL PLATE WITH EXCELLENT BAKE HARDENABILITY AND ANTI-AGING PROPERTY AT ROOM TEMPERATURE

(71) Applicant: POSCO, Pohang-si (KR)

(72) Inventors: Sang-Ho Han, Gwangyang-si (KR); Je-Woong Lee, Gwangyang-si (KR)

(73) Assignee: POSCO, Pohang-si (KR)

( * ) Notice: Subject to any disclaimer, the term of this patent is extended or adjusted under 35 U.S.C. 154(b) by 0 days.

(21) Appl. No.: 16/466,714

(22) PCT Filed: Nov. 8, 2017

(86) PCT No.: PCT/KR2017/012590
§ 371 (c)(1),
(2) Date: Jun. 5, 2019

(87) PCT Pub. No.: WO2018/105904
PCT Pub. Date: Jun. 14, 2018

(65) Prior Publication Data
US 2020/0063233 A1 Feb. 27, 2020

(30) Foreign Application Priority Data

Dec. 7, 2016 (KR) .......................... 10-2016-0165916

(51) Int. Cl.
*C22C 38/38* (2006.01)
*C22C 38/22* (2006.01)
(Continued)

(52) U.S. Cl.
CPC .............. *C21D 9/46* (2013.01); *B32B 15/012* (2013.01); *B32B 15/013* (2013.01); *B32B 15/04* (2013.01);
(Continued)

(58) Field of Classification Search
CPC ... C22C 38/004; C22C 38/001; C22C 38/002; C22C 38/02; C22C 38/06; C22C 38/22;
(Continued)

(56) References Cited

U.S. PATENT DOCUMENTS

2003/0129444 A1 7/2003 Matsuoka et al.
2008/0178972 A1* 7/2008 Saito ........................ C21D 9/46
148/654
(Continued)

FOREIGN PATENT DOCUMENTS

JP 2004292891 10/2004
JP 2005264176 9/2005
(Continued)

OTHER PUBLICATIONS

Machine Translation, Kang et al., KR 10-1607011, Mar. 2016. (Year: 2016).*
(Continued)

*Primary Examiner* — Michael E. La Villa
(74) *Attorney, Agent, or Firm* — Cantor Colburn LLP

(57) ABSTRACT

Provided is a hot-dip galvanized steel plate which is applicable as a material for a vehicle outer panel and has an excellent bake hardenability and anti-aging property at room temperature, and a method for manufacturing a hot-dip galvanized steel plate, the method comprising a process including the steps of: winding a hot-rolled steel plate, followed by cooling at a speed of 0.002-0.027° C./sec; cold-rolling the cooled steel plate; continuously annealing the cold-rolled steel plate; and cooling the annealed steel plate in the multi-stage manner of primary to third rounds.

6 Claims, 1 Drawing Sheet

(51) Int. Cl.
| | |
|---|---|
| C22C 38/32 | (2006.01) |
| C22C 38/02 | (2006.01) |
| C22C 38/06 | (2006.01) |
| C22C 38/00 | (2006.01) |
| C23C 2/02 | (2006.01) |
| C23C 2/06 | (2006.01) |
| C23C 2/28 | (2006.01) |
| C23C 2/40 | (2006.01) |
| C21D 6/00 | (2006.01) |
| C21D 9/46 | (2006.01) |
| C21D 8/02 | (2006.01) |
| B32B 15/01 | (2006.01) |
| C21D 8/04 | (2006.01) |
| C23C 2/26 | (2006.01) |
| C21D 9/48 | (2006.01) |
| C22C 38/12 | (2006.01) |
| C22C 38/04 | (2006.01) |
| C23C 2/04 | (2006.01) |
| C23C 28/00 | (2006.01) |
| C22C 38/18 | (2006.01) |
| C23C 2/12 | (2006.01) |
| B32B 15/18 | (2006.01) |
| B32B 15/04 | (2006.01) |
| C23C 30/00 | (2006.01) |
| C23C 28/02 | (2006.01) |

(52) U.S. Cl.
CPC ............ *B32B 15/043* (2013.01); *B32B 15/18* (2013.01); *C21D 6/002* (2013.01); *C21D 6/005* (2013.01); *C21D 6/008* (2013.01); *C21D 8/0205* (2013.01); *C21D 8/0273* (2013.01); *C21D 8/0463* (2013.01); *C21D 8/0473* (2013.01); *C21D 9/48* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/12* (2013.01); *C22C 38/18* (2013.01); *C22C 38/22* (2013.01); *C22C 38/32* (2013.01); *C22C 38/38* (2013.01); *C23C 2/02* (2013.01); *C23C 2/04* (2013.01); *C23C 2/06* (2013.01); *C23C 2/12* (2013.01); *C23C 2/26* (2013.01); *C23C 2/28* (2013.01); *C23C 2/40* (2013.01); *C23C 28/025* (2013.01); *C23C 28/3225* (2013.01); *C23C 30/00* (2013.01); *C23C 30/005* (2013.01); *C21D 2211/002* (2013.01); *C21D 2211/005* (2013.01); *C21D 2211/008* (2013.01); *Y10T 428/12757* (2015.01); *Y10T 428/12799* (2015.01); *Y10T 428/12972* (2015.01)

(58) Field of Classification Search
CPC ......... C22C 38/32; C22C 38/38; C22C 38/04; C22C 38/12; C22C 38/18; C21D 9/46; C21D 9/48; C21D 8/0463; C21D 8/0473; C21D 8/0205; C21D 8/0273; C21D 6/002; C21D 6/005; C21D 6/008; C21D 2211/002; C21D 2211/005; C21D 2211/008; C23C 2/26; C23C 2/02; C23C 2/06; C23C 2/28; C23C 2/40; C23C 2/04; C23C 2/12; C23C 30/00; C23C 30/005; C23C 28/3225; C23C 28/025; B32B 15/013; B32B 15/012; B32B 15/04; B32B 15/043; B32B 15/18; Y10T 428/12799; Y10T 428/12757; Y10T 428/12972
See application file for complete search history.

(56) References Cited

U.S. PATENT DOCUMENTS

| | | | |
|---|---|---|---|
| 2010/0132850 | A1 | 6/2010 | Ono et al. |
| 2016/0186282 | A1 | 6/2016 | Han et al. |
| 2016/0340755 | A1 | 11/2016 | Han |
| 2017/0306438 | A1 | 10/2017 | Han et al. |

FOREIGN PATENT DOCUMENTS

| | | |
|---|---|---|
| JP | 2009035814 | 2/2009 |
| KR | 20020073564 | 9/2002 |
| KR | 100685036 | 2/2007 |
| KR | 20090071179 | 7/2009 |
| KR | 20140064392 | 5/2014 |
| KR | 101561008 | 10/2015 |
| KR | 101607011 | 3/2016 |
| KR | 101620750 | 5/2016 |
| KR | 1020160078571 | 7/2016 |
| KR | 101767818 | 8/2017 |

OTHER PUBLICATIONS

International Search Report—PCT/KR2017/012590 dated Feb. 13, 2018.

* cited by examiner

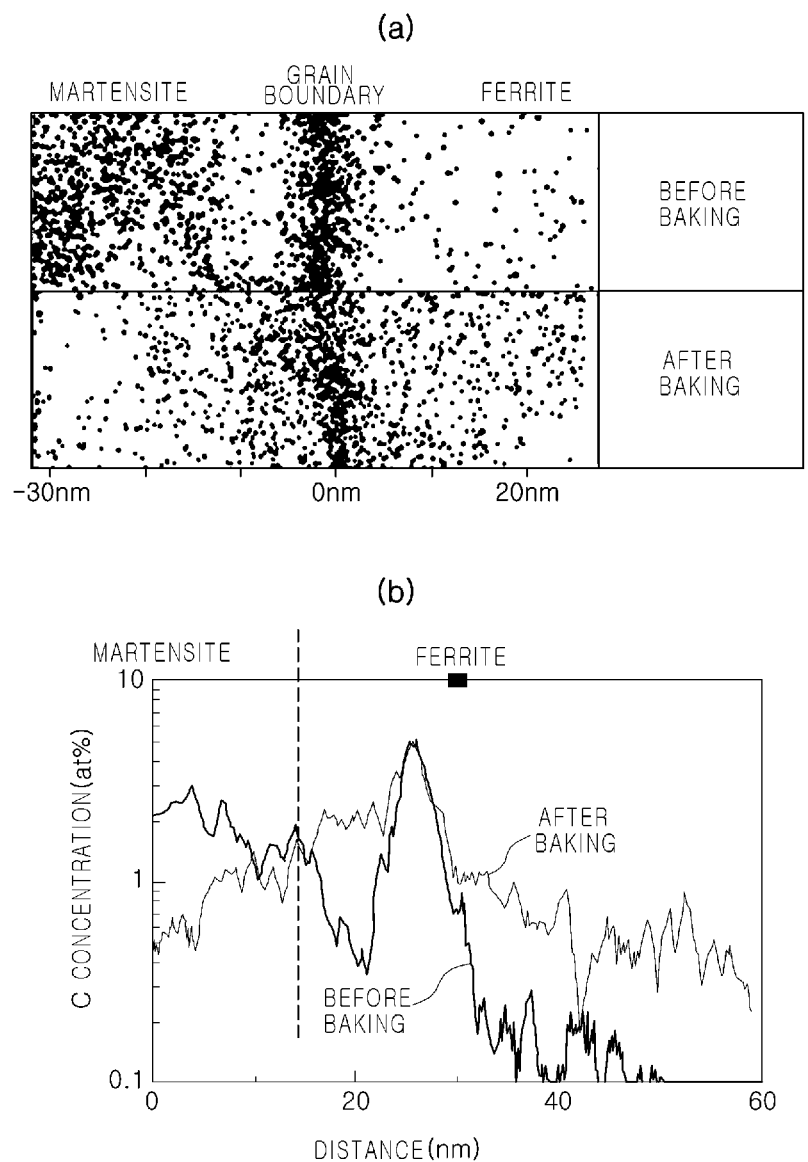

HOT-DIP GALVANIZED STEEL PLATE WITH EXCELLENT BAKE HARDENABILITY AND ANTI-AGING PROPERTY AT ROOM TEMPERATURE

TECHNICAL FIELD

The present disclosure relates to a hot-dip galvanized steel sheet and a method for manufacturing the same, and more particularly, a hot-dip galvanized steel sheet having excellent bake hardenability and room temperature aging resistance, which is applicable as a material for an outer panel of vehicles, and a method for manufacturing the same.

BACKGROUND ART

As impact stability regulations and fuel efficiency of automobiles have been emphasized, high tensile steel has been actively used to satisfy requirements for reducing weight and achieving high strength in automobile bodies. In accordance with this trend, high-strength steel has been increasingly applied to external panels of automobiles.

Currently, 340 MPa-grade bake hardened steel has mostly been used in external panels of automobiles, but 490 MPa-grade steel sheets are also being partially applied, and it is expected that 590 MPa-grade steel sheets will also be increasingly applied.

When such steel sheets having increased strength are applied as an external panel as described above, weight reductions and dent resistance may improve, whereas, as strength increases, formability may be deteriorated, which is a disadvantage. Accordingly, recently, customers are demanding a steel sheet having a relatively low yield ratio (YR=YS/TS) and relatively high ductility to supplement poor workability while applying high-strength steel to an external panel.

In addition, to be applied as a material for external panels of automobiles, a steel sheet may be required to have a certain level or higher bake hardenability. A phenomenon of bake hardenability is a phenomenon in which yield strength increases due to adhesion of solid solution carbon and nitrogen, activated during a paint baking process, onto dislocations during a pressing process. It may be easy to form steel having excellent bake hardenability before a paint baking process, and final products thereof may have enhanced dent resistance. Thus, such steel may be very ideal as a material for the external panels of automobiles. In addition, to apply the steel as the material for external automobile panels, the steel may be required to have a certain level of aging resistance to guarantee aging for a certain period of time or longer.

As a conventional technique for improving workability in a high-strength steel sheet, Reference 1 discloses a steel sheet having a duplex structure mainly composed of martensite, and discloses a method of manufacturing a high-strength steel sheet in which a fine Cu precipitate having a grain size of 1 to 100 nm is dispersed in a structure to improve workability. However, in this technique, it is necessary to add an excessive content of Cu, 2 to 5%, to precipitate fine Cu particles. In this case, hot shortness attributable to Cu may occur, and manufacturing costs may increase excessively.

Reference 2 discloses a steel sheet having a complex structure including ferrite as a main phase, residual austenite as a secondary phase, and bainite and martensite as low temperature transformation phases, and a method for improving ductility and stretch flangeability of the steel sheet. However, this technique has problems in that it may be difficult to secure plating quality and to secure surface quality in a steel making process and a continuous casting process, since large amounts of Si and Al are added to secure the residual austenite phase. Also, a yield ratio may be high as an initial YS value is high due to transformation induced plasticity, which is another disadvantage.

Reference 3 discloses a steel sheet comprising both of soft ferrite and hard martensite as a microstructure, and a manufacturing method for improving an elongation and an r value (a Lankford value) of the steel sheet as a technique for providing a high tensile hot-dip galvanized steel sheet having good workability. However, this technique has problems, in that it may be difficult to secure good plating quality, since a large amount of Si is added and manufacturing costs may increase due to the addition of large amounts of Ti and Mo.

(Reference 1) Japanese Laid-Open Patent Publication No. 2005-264176
(Reference 2) Japanese Laid-Open Patent Publication No. 2004-292891
(Reference 3) Korean Laid-Open Patent Publication No. 2002-0073564

DISCLOSURE

Technical Problem

An aspect of the present disclosure is to provide a hot-dip galvanized steel sheet having excellent bake hardenability and room temperature aging resistance and a method for manufacturing the same.

Technical Solution

According to an aspect of the present disclosure, a hot-dip galvanized steel sheet is provided, the hot-dip galvanized steel sheet comprises a cold-rolled steel sheet; and a hot-dip galvanized layer formed on the cold-rolled steel sheet, and the cold-rolled steel sheet comprises, by weight %, 0.005 to 0.08% of C, 1.3 to 2.3% of Mn, 1.0% or less of Cr, excluding 0%, 0.1% or less of P, excluding 0%, 0.01% or less of S, excluding 0%, 0.01% or less of N, excluding 0%, 0.01 to 0.06% of sol.Al, and a balance of Fe and inevitable impurities, ferrite and martensite are included as a microstructure, and K, an average concentration ratio of solid solution carbon before and after baking determined by Expression 1, is 0.2 to 0.7, [Expression 1] $K=C_1/C_2$, where $C_1$ is an average concentration of solid solution C present within 100 nm in a direction of a ferrite grain from ferrite and martensite grain boundaries at a t/4 position taken in a sheet thickness direction before baking, t indicates a thickness of the cold-rolled steel sheet, and $C_2$ is an average concentration of solid solution C present within 100 nm in a direction of a ferrite grain from ferrite and martensite grain boundaries at a t/4 position taken in a sheet thickness direction after baking performed for 20 minutes at 140° C.

According to another aspect of the present disclosure, a method of manufacturing a hot-dip galvanized steel sheet is provided, the method comprises reheating a slab comprising, by weight %, 0.005 to 0.08% of C, 1.3 to 2.3% of Mn, 0.3% or less of Si, excluding 0%, 1.0% or less of Cr, excluding 0%, 0.1% or less of P, excluding 0%, 0.01% or less of S, excluding 0%, 0.01% or less of N, excluding 0%, 0.01 to 0.06% of sol.Al, 0.2% or less of Mo, excluding 0%, and a balance of Fe and inevitable impurities, and obtaining a hot-rolled steel sheet by hot-rolling the slab in an austenite single phase region; coiling the hot-rolled steel sheet and cooling the coiled hot-rolled steel sheet at a speed of 0.002 to 0.027° C./sec; cold-rolling the cooled hot-rolled steel sheet and obtaining a cold-rolled steel sheet; continuously annealing the cold-rolled steel sheet at Ac1+20° C. to Ac3−20° C.; primarily cooling the continuously annealed cold-rolled steel sheet to 630° C. to 670° C. at an average cooling speed of 2 to 14° C./sec; secondarily cooling the primarily cooled cold-rolled steel sheet to Ms+20° C. to Ms+50° C. at an average cooling speed of 3 to 12° C./sec; tertiarily cooling the secondarily cooled cold-rolled steel sheet to 440° C. to 480° C. at a speed of 4 to 8° C./sec; obtaining a hot-dip galvanized steel sheet by submerging the tertiarily cooled cold-rolled steel sheet in a hot-dip zinc-based plating bath; and finally cooling the hot-dip galvanized steel sheet to Ms-100° C. or less at a speed of 3° C./sec or higher.

Advantageous Effects

According to the present disclosure, a steel sheet of the present disclosure may have excellent room temperature aging resistance and may thus be preferably used as a material for an external panel of vehicles.

However, aspects of the present disclosure are not limited thereto. Additional aspects will be set forth in part in the description which follows, and will be apparent from the description to those of ordinary skill in the related art.

DESCRIPTION OF DRAWINGS (a) of FIG. 1 is an image obtained by observing a process in which solid solution carbon is dispersed into a ferrite grain from martensite and ferrite grain boundaries before and after baking of inventive steel 1 using an APT in atom unit, and (b) of FIG. 1 is graphs representing the process in profile.

BEST MODE FOR INVENTION

The inventors conducted intensive research to provide a hot-dip galvanized steel sheet which may be preferably used as a material for external panels of automobiles. As a result, it has been found that, when a microstructure of a cold-rolled steel sheet, a substrate, is controlled to have a two-phase structure of ferrite and martensite, and distribution of solid solution carbon near ferrite and martensite grain boundaries in the two-phase structure is appropriately controlled, the steel sheet appears to have excellent bake hardenability and excellent room temperature aging resistance at the same time in a wide range of temperature (approximately 140 to 190° C.), and accordingly, the steel sheet may be preferably applied as a material for external panels of vehicles.

In the description below, a hot-dip galvanized steel sheet having excellent bake hardenability and room temperature aging resistance will be described in detail.

A hot-dip galvanized steel sheet of the present disclosure may include a cold-rolled steel sheet, and a hot-dip galvanized layer formed on one surface or both surfaces of the cold-rolled steel sheet. In the present disclosure, a composition of the hot-dip galvanized layer is not particularly limited. The hot-dip galvanized layer may be a pure zinc plated layer or may be a zinc-based alloy plating layer including Si, Al, Mg, and the like. The hot-dip galvanized layer may also be an alloyed hot-dip galvanized layer.

An alloy composition and preferable content ranges thereof of a cold-rolled steel sheet, a substrate, will be described in detail. A content of each element described below is based on a weight unless otherwise indicated.

C: 0.005 to 0.08%

Carbon is an essential element which may be added to secure a duplex structure aimed in the present disclosure. The more the content of carbon increases, the easier the formation of martensite may be, which may be advantageous to manufacturing duplex structure steel. However, to secure intended strength and an yield ratio (yield strength/tensile strength), it may be required to appropriately control a content of carbon. When a content of carbon is lower than 0.005%, it may be difficult to secure the strength aimed in the present disclosure, and it may be difficult to form an appropriate level of martensite. When a content of carbon exceeds 0.08%, the formation of grain boundary bainite may be facilitated during cooling after annealing such that a yield ratio of steel may increase, and indentations and surface defects may easily occur when processing the steel into a vehicle component, which may be disadvantages. Thus, in the present disclosure, a content of carbon may be controlled to be 0.005 to 0.08%, or may be controlled to be 0.007 to 0.06% more preferably.

Mn: 1.3 to 2.3%

Manganese is an element which may improve hardenability in duplex structure steel, and may be an important element in relation to the formation of martensite. When a content of manganese is lower than 1.3%, martensite may not be formed such that it may be difficult to manufacture duplex structure steel. When a content of manganese exceeds 2.3%, martensite may be excessively formed, such that a material may become unstable, and a manganese band may be formed in a structure such that a risk of process cracks and breakage may significantly increase. Also, manganese oxide may be dissolved onto a surface during annealing, which may greatly degrade coatability. Thus, in the present disclosure, a content of manganese may be controlled to be 1.3 to 2.3%, and may be controlled to be 1.7 to 2.1% more preferably.

Cr: 1.0% or less (excluding 0%)

Chromium may have a characteristic similar to that of manganese, and may be added to improve strength of steel along with hardenability of steel. Also, chromium may help in the formation of martensite, and may precipitate solid solution carbon in steel to be an appropriate level of amount or less by forming coarse Cr-based carbide such as $Cr_{23}C_6$ during hot-rolling such that chromium may prevent the generation of yield point elongation (YP-El). Thus, chromium may be advantageous to manufacturing duplex structure steel having a low yield ratio. Also, chromium may minimize a decrease of ductility as compared to an increase of strength such that chromium may also be advantageous to manufacturing high strength duplex structure steel having high ductility. However, when a content of chromium exceeds 1.0%, a martensite structure fraction may excessively increase, which may degrade strength and an elongation. Thus, in the present disclosure, a content of chromium may be controlled to be 1.0% or less.

P: 0.1% or less (excluding 0%)

Phosphorus may be the most advantageous element to secure strength without greatly deteriorating formability, but when phosphorus is excessively included, the possibility of brittleness breakage may significantly increase such that the possibility of breakage of a slab may greatly increase during hot-rolling. Also, phosphorus may degrade plating surface properties, and thus, in the present disclosure, a content of phosphorus may be controlled to be 0.1% or less.

S: 0.01% or less (excluding 0%)

Sulfur is one of impurities which may be inevitably included in steel, and it may be preferable to control a content of sulfur to be low as possible. In particular, sulfur in steel may increase the possibility of hot shortness, and thus, a content of sulfur may be controlled to be 0.01% or less.

N: 0.01% or less (excluding 0%)

Nitride is one of impurities which may be inevitably included in steel, and it may be important to control a content of nitride to be low as possible. To this end, there may be a problem in which the cost of refining steel may rapidly increase, and thus, a content of nitride may be controlled to be 0.01% or less, a range in which operational conditions may be able to be implemented.

Sol.Al: 0.01 to 0.06%

Sol.Al may be added for gain refinement and deoxidation. When a content of sol.Al is lower than 0.01%, generally used stable al-killed steel may not be manufactured. When a content of sol.Al exceeds 0.06%, the content may be advantageous to increasing strength due to a grain refinement effect, but inclusions may be excessively formed during a continuous casting process in steel-making such that the possibility of surface defects of a plating steel sheet may increase, and manufacturing costs may rapidly increase. Thus, in the present disclosure, a content of sol.Al may be controlled to be 0.01 to 0.06%.

A remainder other than the above-described composition is Fe. However, in a general manufacturing process, inevitable impurities may be inevitably added from raw materials or a surrounding environment, and thus, impurities may not be excluded. A person skilled in the art may be aware of the impurities, and thus, the descriptions of the impurities may not be provided in the present disclosure.

An effective component other than the above-described composition is not excluded. For example, one or more elements among Si, Mo, and B may further be included.

Si: 0.3% or less (excluding 0%)

Silicon may contribute to increasing strength of a steel sheet by strengthening solid solution, but in the present disclosure, silicon may not be intentionally added. Even if silicon is not added, there may be no difficulty to secure property. When a content of silicon exceeds 0.3%, plating surface properties may be deteriorated, and thus, in the present disclosure, a content of silicon may be controlled to be 0.3% or less.

Mo: 0.2% or less (excluding 0%)

Molybdenum may delay the transformation of austenite to pearlite and may refine ferrite at the same time, and may also contribute to increasing hardenability and strength of steel. However, even though molybdenum is not added, there may be no difficulty in securing properties. When a content of molybdenum exceeds 0.2%, manufacturing costs may rapidly increase, which may be economically disadvantageous, and ductility of steel may also degrade. Thus, in the present disclosure, a content of molybdenum is controlled to be 0.2% or less.

B: 0.003% or less (excluding 0%)

Boron may prevent secondary process brittleness caused by phosphorus in steel, but even though boron is not added, there may be no difficulty in securing properties. When a content of boron exceeds 0.003%, there may be a problem of degradation of ductility of steel, and thus, in the present disclosure, a content of boron may be controlled to be 0.003% or less.

When manufacturing steel having the above-described composition ranges, it may be preferable to control contents of Mn, Cr, and Mo to satisfy Relational Expression 1 below.

$$0.001 \leq [Mn]/150 + [Cr]/100 + [Mo]/90 \leq 0.026 \quad \text{[Relational Expression 1]}$$

(where Mn, Cr, and Mo indicate a content of each element by weight %)

The elements above may improve hardenability of steel. When the contents of the elements do not satisfy Relational Expression 1, martensite may be formed in a hot-rolling state such that cold-rolling load may increase, and a size of martensite formed during a cooling process after cold-rolling and annealing processes may also be affected. Accordingly, a size of martensite in a final structure may not be uniform such that it may be difficult to secure aimed bake hardenability and room temperature aging resistance. A more preferable lower limit may be 0.009, and an even more preferable upper limit may be 0.020.

In the description below, a microstructure of a cold-rolled steel sheet, a substrate, will be described in detail.

A cold-rolled steel sheet, a substrate of a hot-dip galvanized steel sheet, may include ferrite and martensite as a microstructure, and K, an average solid solution carbon concentration ratio before and after baking determined by Expression 1 below, may be 0.2 to 0.7. In Expression 1 below, $C_1$ is a result of measurement obtained at room temperature (approximately 25° C.) before baking, and $C_2$ is a result of measurement obtained at room temperature (approximately 25° C.) after baking.

$$K = C_1/C_2 \quad \text{[Expression 1]}$$

(where $C_1$ is an average concentration of solid solution C present within 100 nm in a direction of a ferrite grain from ferrite and martensite grain boundaries at a t/4 position taken in a sheet thickness direction before baking, where t indicates a thickness of the cold-rolled steel sheet, and $C_2$ is an average concentration of solid solution C present within 100 nm in a direction of a ferrite grain from ferrite and martensite grain boundaries at a t/4 position taken in a sheet thickness direction after baking performed for 20 minutes at 140° C.)

As described above, the inventors has found that, when a microstructure of a cold-rolled steel sheet is controlled to have a two-phase structure of ferrite and martensite, and the distribution of solid solution carbon near ferrite and martensite grain boundaries in the two-phase structure is appropriately controlled, a hot-dip galvanized steel sheet appearing to have excellent bake hardenability and excellent room temperature aging resistance at the same time in a wide range of temperature (approximately 140 to 190° C.) may be provided.

More specifically, when K is lower than 0.2 in Expression 1, a content of solid solution carbon in martensite positioned near a grain boundary may not be sufficient such that a content of solid solution carbon which may be dispersed into a ferrite grain by baking may be absolutely insufficient, and thus, it may be difficult to secure bake hardenability aimed in the present disclosure. When K exceeds 0.7 in Expression 1, a content of solid solution carbon in ferrite positioned near a grain boundary may be excessive such that an yield point elongation (YP-El) phenomenon may occur in a room temperature toughness test such that it may be difficult to guarantee 6 months of longer of aging at room temperature, and surface defects may occur during processing a component. Also, as a content of solid solution carbon in ferrite is excessive, solid solution carbon may not be smoothly dispersed during baking, and thus, it may be difficult to secure bake hardenability aimed in the present disclosure.

According to an example embodiment, the cold-rolled steel sheet may include ferrite of 90 to 99 area % and martensite of 1 to 10 area % as a microstructure. If an area ratio of martensite is less than 1%, or an area ratio of ferrite exceeds 99%, solid solution carbon may not be sufficiently dispersed into ferrite during baking of paint, and a content of solid solution carbon in entire ferrite may be relatively insufficient such that it may be difficult to secure bake hardenability aimed in the present disclosure. When an area ratio of martensite exceeds 10%, or an area ratio of ferrite is lower than 90%, excessive solid solution carbon may be present in ferrite such that it may be difficult to secure aimed aging resistance at room temperature.

According to an example embodiment, the cold-rolled steel sheet may further include bainite as a microstructure, and a bainite area ratio (B) defined by Expression 2 below is 3 or less (including 0). When an area ratio (B) of bainite exceeds 3, carbon concentration around bainite may increase such that ductility of steel may be deteriorated, and an yield ratio may rapidly increase.

$$B=\{A_B/(A_F+A_M+A_B)\}\times 100 \quad \text{[Expression 2]}$$

(where $A_F$ indicates an area ratio of ferrite, $A_M$ indicates an area ratio of martensite, and $A_B$ is an area ratio of bainite)

The hot-dip galvanized steel sheet in the present disclosure may have an advantage of excellent bake hardenability, and even when the hot-dip galvanized steel sheet is baked at 170° C., a general baking temperature in a vehicle process, and also at 140 to 190° C., a relatively broad annealing temperature range including 170° C., aimed bake hardenability may be secured. According to an example embodiment, but not limited thereto, the hot-dip galvanized steel sheet may have 35 MPa or higher of bake hardenability amount (BH) when the hot-dip galvanized steel sheet is baked for 20 minutes at 140° C.

Also, the hot-dip galvanized steel sheet in the present disclosure may have an advantage of excellent room temperature aging resistance. According to an example embodiment, but not limited thereto, the hot-dip galvanized steel sheet may have an yield point elongation (YP-El) of 0.2% or less (including 0%) after a 1 hour of heat treatment at 100° C.

The hot-dip galvanized steel sheet described above may be manufactured by various methods, and the manufacturing method is not particularly limited. However, as a preferable example embodiment, the hot-dip galvanized steel sheet may be manufactured by the method as below.

In the description below, a method of manufacturing a hot-dip galvanized steel sheet having excellent bake hardenability and room temperature aging resistance, another aspect of the present disclosure, will be described.

A steel slab having the above described composition system may be reheated. The reheating process may be performed to smoothly perform a hot-rolling process, performed later, and to sufficiently obtain aimed property of a steel sheet. In the present disclosure, process conditions of the reheating process will not be particularly limited, and general conditions may be used. As an example, the reheating process may be performed at a temperature range of 1100 to 1300° C.

The reheated steel slab may be hot-rolled in an austenite single phase region, thereby obtaining a hot-rolled steel sheet. The hot-rolling may be performed in an austenite single phase region to increase uniformity of a structure.

According to an example embodiment, during the hot-rolling, a finish rolling temperature in the hot-rolling may be Ar3+50° C. to 950° C. When the finish rolling temperature is lower than Ar3+50° C., it may be highly likely that a ferrite and austenite two-phase region may be rolled, which may cause non-uniformity of a material. When the finish rolling temperature exceeds 950° C., non-uniformity of a material may occur due to the formation of an abnormal coarse grain caused by a high temperature hot-rolling, and accordingly, a coil may be distorted during cooling the hot-rolled steel sheet. A theoretical temperature of Ar3 may be obtained by Expression 3 below.

$$\text{Ar3(° C.)}=910-310[C]-80[Mn]-20[Cu]-15[Cr]-55[Ni]-80[Mo] \quad \text{[Expression 3]}$$

(where [C], [Mn], [Cu], [Cr], [Ni], and [Mo] indicate a content of each element by weight %)

The hot-rolled steel sheet may be coiled.

According to an example embodiment, a coiling temperature may be 450 to 700° C. When the coiling temperature is lower than 450° C., martensite or bainite may be excessively formed such that strength of the hot-rolled steel sheet may excessive increase, and the problem of shape defects may be caused due to load during the cold-rolling. When the coiling temperature exceeds 700° C., elements which may degrade wetness of a hot-dip zinc plating, such as Si, Mn, B, and the like, in steel, may be greatly thickened on a surface.

The coiled hot-rolled steel sheet may be cooled. In the present disclosure, it may be preferable that there is no martensite in a structure in a hot-rolling state, and that the structure is formed of ferrite and partially formed of pearlite. That is because, if martensite is present in a hot-rolling state, steel may be hardened, and a cold-rolling load may increase such that a shape of the sheet may be distorted after cold-rolling, and rolling properties may significantly degrade. Also, a size of martensite formed during a cooling process after cold-rolling and annealing processes may be affected, and a size of martensite may not be uniformly formed such that it may be difficult to secure aimed bake hardenability and room temperature aging resistance. Considering the issue above, it may be preferable to control a cooling speed during the cooling of the coiled hot-rolled steel sheet to be 0.027° C./sec or less, and it may be more preferable to control the speed to be 0.02° C./sec or less. If the cooling speed is too slow, productivity may degrade, and carbon may be excessively dispersed, such that even a small amount of solid solution carbon may be precipitated as carbide, and accordingly, ductility may degrade. Considering this, it may be preferable to control the cooling speed during the cooling of the coiled hot-rolled steel sheet to be 0.002° C./sec or more, and it may be more preferable to control the speed to be 0.01° C./sec or more. In the present disclosure, a cooling terminating temperature during the cooling of the coiled hot-rolled steel sheet is not particularly limited, and the cooling may be performed to 200 to 300° C., a temperature range in which transformation is completed.

The coiled hot-rolled steel sheet may be cold-rolled, thereby obtaining a cold-rolled steel sheet.

According to an example embodiment, a cold reduction ratio may be 40 to 80% during the cold-rolling. When the cold reduction ratio is lower than 40%, it may be difficult to secure a target thickness and to correct a shape of the steel sheet. When the cold reduction ratio exceeds 80%, cracks may occur in an edge of the steel sheet, and cold-rolling load may be caused.

Thereafter, the cold-rolled steel sheet may be continuously annealed. The process may be performed to achieve recrystallization and to form ferrite and austenite at the same time, and to distribute carbon.

A preferable annealing temperature may be Ac1+20° C. to Ac3−20° C. When the annealing temperature is lower than Ac1+20° C., fine martensite may not be sufficiently formed during the cooling after a final annealing as an austenite fraction is not sufficient in a low two-phase region (ferrite+austenite) temperature, and accordingly, bake hardenability required in the present disclosure may not be obtained. When the annealing temperature exceeds Ac3−20° C., an austenite fraction may be excessively high during the two-phase region annealing, and a size of martensite after the annealing cooling may become coarse, and a fraction thereof may exceeds 10% such that strength may rapidly increase, and the possibility of process cracks may increase during a component forming process. Thus, it may be preferable to control an appropriate annealing temperature range to be Ac1+20° C. to Ac3−20° C. Theoretical temperatures of Ac1 and Ac3 may be obtained by Expressions 4 and 5 below.

$$Ac1(° C.)=723-10.7[Mn]-16.9[Ni]+29.1[Si]+16.9[Cr] \quad \text{[Expression 4]}$$

$$Ac3(° C.)=910-203\sqrt{[C]}-15.2[Ni]+44.7[Si]+104[V]+31.5[Mo]+13.1[W] \quad \text{[Expression 5]}$$

(where [Mn], [Ni], [Si], [Cr]. [C], [V], [Mo], and [W] indicate a content of each element by weight %)

Thereafter, the continuously annealed cold-rolled steel sheet may be primarily cooled to 630 to 670° C. at an average cooling speed of 2 to 14° C./sec.

In the present disclosure, the higher the primary cooling terminating temperature is controlled to be, or the slower the primary cooling speed is controlled to be, uniformity and coarsening tendency of ferrite may increase, which may be advantageous to securing ductility of steel. Also, in the present disclosure, to endow a sufficient time for carbon to be dispersed to austenite during the primary cooling may be a main feature. This feature may be significant in the present disclosure. More specifically, carbon may be dispersed and moved to austenite of which a carbon concentration degree is high in a two-phase region, and the higher the temperature thereof, and the longer the time thereof, the degree of the dispersion may further increase. When the primary cooling terminating temperature is lower than 630° C., a dispersion action degree of carbon may be low due to excessively low temperature such that carbon concentration in ferrite may increase, an yield ratio may increase, and it may be highly likely that cracks may increase during processing. When the primary cooling terminating temperature exceeds 670° C., it may be advantageous in terms of dispersion of carbon, but an excessively high cooling speed may be required during a secondary cooling, which may be a disadvantage. Also, when the primary cooling speed is lower than 2° C./sec, it may be disadvantageous in terms of productivity, whereas when the speed exceeds 14° C./sec, carbon may not be sufficiently dispersed, which may not be preferable.

The primarily cooled cold-rolled steel sheet may be secondarily cooled to Ms+20° C. to Ms+50° C. at an average cooling speed of 3 to 12° C./sec.

According to the research of the inventors, if martensite is formed before passing through 440 to 480° C., a coarse martensite may be formed on a finally obtained cold-rolled steel sheet such that a low yield ratio may not be achieved. When the secondary cooling termination temperature is lower than Ms+20° C., martensite may be formed during the secondary cooling. When the temperature exceeds Ms+50° C., it may be required to control a cooling speed before entering a plating bath after the secondary cooling, a tertiary cooling speed, to be relatively high. Further, it may be highly likely that martensite may be formed before being submerged into the plating bath. When the secondary cooling speed is lower than 3° C./sec, martensite may not be formed, but it may be disadvantageous in terms of productivity. When the speed exceeds 12° C./sec, an overall passing speed of the sheet may increase such that the problem of distortion of a shape of a sheet, and the like, may occur. A theoretical temperature of Ms may be obtained by Expression 6 below.

$$Ms(° C.)=539-423[C]-30.4[Mn]-12.1[Cr]-17.7[Ni]-7.5[Mo] \quad \text{[Expression 6]}$$

(where [C], [Mn], [Cr], [Ni], and [Mo] indicate a content of each element by weight %)

Thereafter, the secondarily cooled cold-rolled steel sheet may be tertiarily cooled to 440° C. to 480° C. at a speed of 4 to 8° C./sec.

The temperature range is a general temperature range of a zinc-based plating bath, and the process may be performed to prevent a martensite structure from being formed before the cold-rolled steel sheet is submerged into the zinc-based plating bath. When the tertiarily cooling speed is lower than 4° C./sec, martensite may not be formed, but it may be disadvantageous in terms of productivity. When the speed exceeds 8° C./sec, martensite may be partially formed in a grain, and bainite may be partially formed, and accordingly, yield strength may increase and ductility may be deteriorated.

The tertiarily cooled cold-rolled steel sheet may be submerged into a hot-dip zinc-based plating bath, thereby obtaining a hot-dip galvanized steel sheet. A composition of the hot-dip zinc-based plating bath is not particularly limited in the present disclosure, and the zinc-based plating bath may be a pure zinc plating bath or a zinc-based alloy plating bath including Si, Al, Mg, and the like.

The hot-dip galvanized steel sheet may be finally cooled to Ms-100° C. or less at an average cooling speed of 3° C./sec or higher. When the final cooling terminating temperature is lower than Ms-100° C., fine martensite may not be obtained, and the problem of sheet shape defects may occur. Also, an average cooling speed is lower than 3° C./sec, martensite may be irregularly formed in a grain boundary or in a grain due to the too slow cooling speed, and also, steel having a low yield ratio may not be manufactured as a formation ratio of martensite in a grain boundary is too low as compared to that of martensite in a grain.

If necessary, an alloyed hot-dip galvanized steel sheet may be obtained by performing an alloying heat treatment on the hot-dip galvanized steel sheet before the final cooling. In the present disclosure, process conditions of the alloying heat treatment are not particularly limited, and general conditions may be used. As an example, the alloying heat treatment process may be performed at a temperature range of 500 to 540° C.

Thereafter, if necessary, the finally cooled hot-dip galvanized steel sheet or the alloyed hot-dip galvanized steel sheet may be skin-pass rolled to form a large amount of dislocation in ferrite positioned around martensite, thereby further improving bake hardenability.

In this case, a preferable reduction ratio may be 0.3 to 1.6%, and a more preferable reduction ratio may be 0.5 to 1.4%. When the reduction ratio is lower than 0.3%, sufficient dislocation may not be formed, it may be disadvantageous in terms of a sheet shape, and particularly, plating surface defects may occur. When the reduction ratio exceeds 1.6%, it may be advantageous in terms of the formation of dislocation, but defects such as breakage may occur due to a limitation in facility capability.

In the description below, an example embodiment of the present disclosure will be described in greater detail. It should be noted that the exemplary embodiments are provided to describe the present disclosure in greater detail, and to not limit the scope of rights of the present disclosure. The scope of rights of the present disclosure may be determined on the basis of the subject matters recited in the claims and the matters reasonably inferred from the subject matters.

MODE FOR INVENTION

Embodiment

A steel slab having an alloy composition listed in Table 1 below was prepared, and a hot-dip galvanized steel sheet (GI steel sheet) or an alloyed hot-dip galvanized steel sheet (GA steel sheet) was manufactured using manufacturing processes listed in Table 2. In Table 1, inventive steels 1, 2, 4, and 5 and comparative steels 1 and 2 are alloyed hot-dip galvanized steel sheets, and inventive steels 3, 6, and 7 may be hot-dip galvanized steel sheets. When manufacturing each sample, a primary cooling terminating temperature was 650° C., a secondary cooling terminating temperature was 510° C., a tertiary cooling terminating temperature was 460° C., and a plating bath temperature was 460° C. in all samples.

Thereafter, a microstructure of each of the manufactured steel sheets was observed, properties thereof were examined, and the results were listed in Table 3 below.

In Table 3, a microstructure fraction was obtained by observing martensite and bainite through Lepelar corrosion at a ¼ t point of a sheet thickness using an optical microscope and observing martensite and bainite again using an SEM (3,000 magnification), and measuring sizes and distribution amounts of martensite and bainite based on a three-time averaged value through a count point task. A phase other than the above-described structures were assumed as a content of ferrite. In Table 3, a tensile test for each sample were conducted in a C direction (a direction perpendicular to a rolling direction) using a JIS standard.

Bake hardenability was measured through a baking process performed for 20 minutes at 140° C., and was examined based on an yield strength difference after 2% pre-strain. Aging resistance was examined by measuring YP-El (%) in a tensile test after maintaining the steel sheet for 1 hour at 100° C.

Also, to analyze a value K ($C_1/C_2$) based on room temperature and baking temperature, an APT devices which may visualize distribution of compositions three-dimensionally with sub-nanometer spatial resolution was used.

To examine a degree of dispersion of solid solution carbon into ferrite from martensite and ferrite grain boundaries, the numbers of solid solution C within a square of a length of 100 nm were measured by a count method with reference to a grain boundary using an atom probe tomography (APT) carbon profile, and the numbers of solid solution C were three-time averaged.

TABLE 1

| Steel Type | Cold-Rolled Steel Sheet Alloy Composition (weight %) | | | | | | | | | |
| --- | --- | --- | --- | --- | --- | --- | --- | --- | --- | --- |
| | C | Mn | Si | Cr | P | S | N | sol.Al | Mo | B |
| Inventive Steel 1 | 0.007 | 2.21 | 0.05 | 0.80 | 0.005 | 0.005 | 0.003 | 0.018 | 0.15 | 0.0006 |
| Inventive Steel 2 | 0.023 | 1.96 | — | 0.48 | 0.005 | 0.005 | 0.003 | 0.04 | 0.12 | 0.0009 |
| Inventive Steel 3 | 0.050 | 1.73 | 0.10 | 0.43 | 0.003 | 0.007 | 0.004 | 0.05 | 0.13 | — |
| Inventive Steel 4 | 0.061 | 1.64 | 0.15 | 0.81 | 0.002 | 0.004 | 0.003 | 0.041 | — | 0.0021 |
| Inventive Steel 5 | 0.069 | 1.43 | 0.22 | 0.57 | 0.002 | 0.003 | 0.004 | 0.052 | 0.18 | — |
| Inventive Steel 6 | 0.075 | 1.55 | 0.21 | 0.08 | 0.003 | 0.004 | 0.008 | 0.025 | 0.08 | 0.0012 |
| Inventive Steel 7 | 0.077 | 1.61 | 0.13 | 0.02 | 0.005 | 0.006 | 0.003 | 0.042 | 0.15 | 0.0025 |
| Comparative Steel 1 | 0.0021 | 0.15 | 0.05 | 0.005 | 0.006 | 0.004 | 0.002 | 0.032 | — | 0.0008 |
| Comparative Steel 2 | 0.12 | 1.26 | 0.81 | 1.21 | 0.006 | 0.007 | 0.005 | 0.05 | 0.38 | 0.0041 |

TABLE 2

| Steel Type | Reheating Temperature (° C.) | Finish Rolling Temperature (° C.) | Coiling Temperature (° C.) | Cooling Speed After Coiling (° C./s) | Cold Reduction Ratio (%) | Annealing Temperature (° C.) | Primary Cooling Speed (° C./s) | Secondary Cooling Speed (° C./s) | Tertiary Cooling Speed (° C./s) | Final Cooling SPeed (° C./s) | Note |
| --- | --- | --- | --- | --- | --- | --- | --- | --- | --- | --- | --- |
| Inventive Steel 1 | 1184 | 882 | 596 | 0.012 | 51 | 768 | 2.3 | 4.4 | 4.3 | 4.9 | Embodiment 1 |
| | 1191 | 894 | 556 | 0.013 | 54 | 767 | 2.4 | 4.5 | 4.6 | 5.2 | Embodiment 2 |
| Inventive Steel 2 | 1185 | 910 | 466 | 0.018 | 61 | 774 | 3.1 | 3.1 | 5.2 | 6.2 | Embodiment 3 |
| | 1184 | 920 | 472 | 0.019 | 63 | 792 | 3.6 | 3.5 | 5.5 | 6.3 | Embodiment 4 |

TABLE 2-continued

| Steel Type | Reheating Temperature (° C.) | Finish Rolling Temperature (° C.) | Coiling Temperature (° C.) | Cooling Speed After Coiling (° C./s) | Cold Reduction Ratio (%) | Annealing Temperature (° C.) | Primary Cooling Speed (° C./s) | Secondary Cooling Speed (° C./s) | Tertiary Cooling Speed (° C./s) | Final Cooling Speed (° C./s) | Note |
|---|---|---|---|---|---|---|---|---|---|---|---|
| Inventive Steel 3 | 1201 | 894 | 686 | 0.014 | 73 | 811 | 4.9 | 6.1 | 6.3 | 9.1 | Embodiment 5 |
|  | 1202 | 899 | 643 | 0.014 | 71 | 812 | 4.1 | 6.8 | 6.1 | 9.6 | Embodiment 6 |
| Inventive Steel 4 | 1196 | 915 | 584 | 0.035 | 73 | 725 | 5.6 | 9.1 | 7.8 | 5.2 | Comparative Example 1 |
|  | 1198 | 932 | 589 | 0.012 | 73 | 821 | 5.8 | 10.2 | 7.5 | 7.8 | Embodiment 7 |
| Inventive Steel 5 | 1185 | 912 | 631 | 0.0013 | 63 | 839 | 8.5 | 12.6 | 7.1 | 6.4 | Comparative Example 2 |
| Inventive Steel 6 | 1196 | 897 | 686 | 0.023 | 33 | 841 | 7.3 | 8.5 | 9.2 | 5.3 | Comparative Example 3 |
|  | 1195 | 897 | 643 | 0.0015 | 68 | 834 | 16.5 | 7.2 | 9.2 | 8.9 | Comparative Example 4 |
| Inventive Steel 7 | 1201 | 895 | 684 | 0.015 | 35 | 846 | 7.5 | 8.5 | 9.3 | 5.2 | Comparative Example 5 |
|  | 1203 | 893 | 642 | 0.014 | 68 | 835 | 17.5 | 7.2 | 9.1 | 8.9 | Comparative Example 6 |
| Comparative Steel 1 | 1203 | 923 | 672 | 0.013 | 72 | 802 | 2.8 | 6.1 | 11.5 | 5.3 | Comparative Example 7 |
| Comparative Steel 2 | 1199 | 894 | 356 | 0.015 | 76 | 802 | 3.7 | 6.5 | 6.8 | 5.4 | Comparative Example 8 |
|  | 1187 | 885 | 684 | 0.016 | 78 | 779 | 4.1 | 7.8 | 8.3 | 3.8 | Comparative Example 9 |

TABLE 3

| Steel Type | ① | ② | ③ | ④ | YP-El (%) | L-BH (MPa) | El (%) | YS (MPa) | Note |
|---|---|---|---|---|---|---|---|---|---|
| Inventive Steel 1 | 2.7 | 0.1 | 91.2 | 0.31 | 0 | 42 | 37 | 238 | Inventive Steel 1 |
|  | 1.2 | 0.1 | 98.7 | 0.28 | 0 | 44 | 34 | 242 | Inventive Steel 2 |
| Inventive Steel 2 | 3.3 | 0.1 | 96.6 | 0.45 | 0 | 48 | 38 | 283 | Inventive Steel 3 |
|  | 3.2 | 0.1 | 96.7 | 0.58 | 0 | 39 | 35 | 278 | Inventive Steel 4 |
| Inventive Steel 3 | 4.2 | 0.1 | 95.7 | 0.29 | 0 | 50 | 36 | 292 | Inventive Steel 5 |
|  | 5.3 | 0.1 | 94.6 | 0.65 | 0 | 47 | 35 | 289 | Inventive Steel 6 |
| Inventive Steel 4 | 0 | 0 | 100 | 0.05 | 0.52 | 23.5 | 33 | 292 | Comparative Steel 1 |
|  | 2.1 | 0.3 | 97.6 | 0.45 | 0 | 39 | 33 | 289 | Inventive Steel 7 |
| Inventive Steel 5 | 2.2 | 0 | 97.8 | 0.14 | 0.3 | 31 | 32 | 265 | Comparative Steel 2 |
| Inventive Steel 6 | 1.8 | 0.6 | 97.6 | 0.15 | 0.35 | 43 | 32 | 278 | Comparative Steel 3 |
|  | 10.2 | 0 | 89.8 | 0.85 | 0.61 | 26 | 31 | 281 | Comparative Steel 4 |
| Inventive Steel 7 | 1.8 | 0.5 | 97.7 | 0.15 | 0.28 | 28 | 32 | 265 | Comparative Steel 5 |
|  | 2.1 | 1.1 | 96.8 | 0.83 | 0 | 26 | 33 | 262 | Comparative Steel 6 |
| Comparative Steel 1 | 0 | 0 | 100 | 0 | 0.3 | 27 | 38 | 213 | Comparative Steel 7 |
| Comparative Steel 2 | 12.3 | 4.1 | 83.6 | 0.85 | 0.32 | 45 | 30 | 321 | Comparative Steel 8 |
|  | 13.1 | 4.3 | 82.6 | 0.89 | 0.31 | 38 | 32 | 313 | Comparative Steel 9 |

In the table, ① indicates a martensite area ratio (%), ② indicates a bainite area ratio (%), ③ indicates a ferrite area ratio (%), ④ indicates a value K, and YP-El 0% indicates that room temperature aging resistance may be guaranteed.

Referring to Table 3, as for inventive steels 1 to 7 which satisfied alloy compositions and manufacturing conditions suggested in the present disclosure, aging resistance was secured at room temperature (an yield point elongation (YP-El) was 0.2% or less after a heat treatment for 1 hour at 100° C.), and 350 MPa or higher bake hardenability appeared at a baking temperature of 140° C.

As for comparative steel 1, an annealing temperature was lower than the range suggested in the present disclosure, and accordingly, martensite was partially formed in a hot-rolling state as a cooling speed was high after hot-rolling and coiling, but austenite was not sufficiently formed during a two-phase region annealing after cold-rolling such that martensite was not sufficiently formed in a final structure. Accordingly, aimed bake hardenability was not secured.

As for comparative steel 2, a cooling speed after coiling was lower than the range suggested in the present disclosure, and a secondary cooling speed exceeded the range suggested in the present disclosure. Thus, aimed aging resistance and bake hardenability were not obtained.

As for comparative steels 3 to 6, the primary or tertiary cooling speed was beyond the suggested range, or a cold reduction ratio was lower than the suggested range. As a result, aging resistance or bake hardenability was not sufficient. In comparative steel 4, a content of martensite in a structure was excessive.

As for comparative steel 7, a composition system of comparative steel 7 was different from that of the present disclosure in that comparative steel 7 was the sample in which bake hardenability steel was manufactured using general extremely low carbon steel. Accordingly, martensite was not sufficiently formed in a structure, and there was a problem in aging resistance and bake hardenability.

As for comparative steel 8, when a coiling temperature is too low, or a baking temperature is too high, a content of martensite in a steel structure was excessive, which may cause a problem in aging resistance. In comparative steel 9, when a tertiary cooling speed is too high, a content of martensite in a structure was too high, and there was a problem in aging resistance.

FIG. 1(a) is an image obtained by observing a process in which solid solution carbon is dispersed into a ferrite grain from martensite and ferrite grain boundaries before and after baking of inventive steel 1 using an APT in atom unit. FIG. 1(b) is graphs representing the process in profile.

While exemplary embodiments have been shown and described above, the scope of the present disclosure is not limited thereto, and it will be apparent to those skilled in the art that modifications and variations could be made without departing from the scope of the present invention as defined by the appended claims.

The invention claimed is:

1. A hot-dip galvanized steel sheet comprising:
a cold-rolled steel sheet; and
a hot-dip galvanized layer formed on the cold-rolled steel sheet,
wherein the cold-rolled steel sheet comprises, by weight %, 0.005 to 0.08% of C, 1.3 to 2.3% of Mn, 1.0% or less of Cr excluding 0%, 0.1% or less of P excluding 0%, 0.01% or less of S excluding 0%, 0.01% or less of N excluding 0%, 0.01 to 0.06% of sol.Al, one or more of 0.3% or less of Si, 0.2% or less of Mo and 0.003% or less of B, and a balance of Fe and inevitable impurities,
wherein ferrite and martensite are included as a microstructure of the cold-rolled steel sheet, and
wherein, K, an average concentration ratio of solid solution carbon before and after baking determined by Expression 1 below, is 0.2 to 0.7, $$K=C_1/C_2 \qquad \text{[Expression 1]}$$

where $C_1$ and $C_2$ are an average concentration of solid solution C before and after baking performed for 20 minutes at 140° C., respectively, in an area within 100 nm in a direction of a ferrite grain from a grain boundary of ferrite and martensite at a t/4 position (t=a thickness of the cold-rolled sheet) from a surface of the cold-rolled steel sheet.

2. The hot-dip galvanized steel sheet of claim 1, wherein the cold the microstructure comprises: 90 to 99 area % of the ferrite and 1 to 10 area % of the martensite.

3. The hot-dip galvanized steel sheet of claim 1, wherein the microstructure further comprises bainite, and an area ratio of bainite, B, defined by Expression 2 below, is 3 or less, $$B=\{A_B/(A_F+A_M+A_B)\}\times 100 \qquad \text{[Expression 2]}$$

where $A_F$ indicates an area ratio of ferrite, $A_M$ indicates an area ratio of martensite, and $A_B$ is an area ratio of bainite.

4. The hot-dip galvanized steel sheet of claim 1, wherein the cold-rolled steel sheet satisfies Relational Expression 1 below, $$0.001 \leq [Mn]/150+[Cr]/100+[Mo]/90 \leq 0.026 \quad \text{[Relational Expression 1]}$$

where Mn, Cr, and Mo indicate a content of each element by weight %.

5. The hot-dip galvanized steel sheet of claim 1, wherein the hot-dip galvanized layer comprises: one or more elements selected from the group consisting of Si, Al, and Mg.

6. The hot-dip galvanized steel sheet of claim 1, wherein, after the baking, an amount of bake hardenability, BH, is 35 MPa or higher, and when a heat treatment is performed for 1 hour at 100° C., an yield point, YP-El, is 0.2% or less, including 0%.

* * * * *